United States Patent
Casset

(10) Patent No.: US 7,505,246 B2
(45) Date of Patent: Mar. 17, 2009

(54) VARIABLE CAPACITANCE WITH DIELECTRIC FLUID

(75) Inventor: Fabrice Casset, Tencin (FR)

(73) Assignee: Commissariat A l'Energie Atomique, Immeuble "Le Ponant D" (FR)

( * ) Notice: Subject to any disclaimer, the term of this patent is extended or adjusted under 35 U.S.C. 154(b) by 175 days.

(21) Appl. No.: 11/575,889

(22) PCT Filed: Sep. 30, 2005

(86) PCT No.: PCT/FR2005/050798

§ 371 (c)(1),
(2), (4) Date: Mar. 23, 2007

(87) PCT Pub. No.: WO2006/054006

PCT Pub. Date: May 26, 2006

(65) Prior Publication Data

US 2008/0037197 A1    Feb. 14, 2008

(30) Foreign Application Priority Data

Oct. 4, 2004    (FR) .................................. 04 52251

(51) Int. Cl.
*H01G 5/00* (2006.01)
(52) U.S. Cl. ............... 361/287; 361/277; 361/283.3; 361/285; 361/290; 361/292
(58) Field of Classification Search ............... 361/287, 361/272–273, 277–278, 283.1, 283.3, 285–286, 361/290–292; 73/105, 724
See application file for complete search history.

(56) References Cited

U.S. PATENT DOCUMENTS 4,380,932 A    4/1983 Mott et al.
5,134,886 A *  8/1992 Ball ........................... 73/718
5,869,751 A *  2/1999 Bonin ........................ 73/105
6,006,386 A * 12/1999 Mohaupt .................. 73/862.68

(Continued)

FOREIGN PATENT DOCUMENTS

DE    1105519    4/1961

(Continued)

OTHER PUBLICATIONS

Darin J. Young and Bernhard E. Boser: "A micromachined variable capacitor for monolithic low-noice VCOs", Solid-State Sensor and Actuator Workshop 1996: pp. 86-89.

(Continued)

*Primary Examiner*—Nguyen T Ha
(74) *Attorney, Agent, or Firm*—Pearne & Gordon LLP

(57) ABSTRACT

The variable capacitance (1) according to the invention is based on a novel principle: a dielectric fluid (20) is placed in the air gap constituted by two capacitor electrodes (12, 14), the fluid being able to be displaced in a direction and outside the cavity (10) formed between said two electrodes (12, 14). Advantageously, the dielectric fluid (20) is displaced according to the principle of communicating vessels, with the presence of a second cavity (30) in fluidic relation with the first cavity. Actuation electrodes (46, 48) in the second cavity (30) induce the deflection of a membrane (44) in order to modify the relative heights of fluidic liquid in the two cavities (10, 30).

15 Claims, 4 Drawing Sheets

U.S. PATENT DOCUMENTS

| | | | |
|---|---|---|---|
| 6,122,972 A | 9/2000 | Crider et al. | |
| 6,418,793 B1 * | 7/2002 | Pechoux et al. | 73/714 |
| 6,437,965 B1 * | 8/2002 | Adkins et al. | 361/303 |
| 6,587,326 B2 * | 7/2003 | Depetro et al. | 361/277 |

FOREIGN PATENT DOCUMENTS

| | | |
|---|---|---|
| GB | 1064889 | 4/1967 |

OTHER PUBLICATIONS

Yao J.J et al.: "high tuning ratio MEMS based tunable capacitors for RF communication applications", Solid-State Sensor and Actuator Workshop 1998: pp. 124-127.

Jun-Bo Yoon and Clark T.-C. Nguyen: A high-Q tunable micromechanical capacitor with moveable dielectric for RF application:, IEDM, 2000: pp. 489-492.

* cited by examiner

VARIABLE CAPACITANCE WITH DIELECTRIC FLUID

TECHNICAL FIELD

The invention relates to the field of capacitor type electronic devices having a variable capacitance and, more particularly, to electromechanical microsystems in which the capacitance is modulated by the variation in volume of a dielectric fluid between two electrodes.

STATE OF THE PRIOR ART

The development of increasingly smaller and efficient portable devices prompts the search for new components to perform new functionalities. Thus, in radiofrequency (RF) applications such as mobile telephony, portable computers, or any other communicating object, etc., Micro-Electro-Mechanical Systems (or MEMS) are credible alternatives to "conventional" microelectronic components due to their integration and their theoretical performance.

In this context, MEMS devices in which the capacitance (electrical) is variable but having a low actuation voltage and a wide range of capacitance variation are sought. The field of RF imposes moreover a dissociation between the actuation zone and the "active" zone used for the capacitance variation, in order to avoid the RF signal perturbing the capacitance variation.

In a conventional manner, when two electrodes have an opposing surface area S and are separated by a distance d by a permittivity medium $\epsilon$, the capacitance C between the two electrodes is defined by the following expression:

$$C = \frac{\epsilon S}{d}.$$

To vary the capacitance, three parameters can thus be modified: one can firstly vary the distance between the electrodes. The most widespread example for such a "variable capacitance with air gap variation" may be modelled by a fixed electrode (on a substrate) and a mobile electrode, actuated in an electrostatic manner for example. Numerous embodiments are available in the literature, such as for example the structure of Young and Boser ("A micromachined variable capacitor for monolithic low noise VCOs", *Solid State Sensor and Actuator Workshop* 1996: 86-89).

However, the value of the capacitance is defined by the air gap between the two electrodes: since an electrode is suspended, the stability of the capacitance value is not assured. Moreover, variable capacitances with air gap variation by electrostatic actuation have a major problem: at one third of the initial air gap, the electrostatic forces become preponderant compared to the return forces, and there is an abrupt bonding of the electrodes ("pull-in" phenomenon), which considerably limits the range of capacitance variation.

Since the capacitance is inversely proportional to the height of the air gap, the latter cannot be increased to increase the range of capacitance variation, on pain of having extremely low capacitance values. Different solutions have been envisaged to mitigate this problem, but the results are complex from a technological point of view, and do not resolve the problem of non stability of the capacitance.

Other actuations have also been envisaged. However, thermal actuation has the major drawback of heavy consumption. As for piezoelectric actuation, it is still little used in production.

Another possibility is the variation in the opposing surface area of the electrodes. For these "surface variation variable capacitances", the most widespread example is that described in the document of Yao J J et al. ("High tuning ratio MEMS based tunable capacitors for RF communication applications", *Solid State Sensor and Actuator Workshop* 1998: 124-127). The structure is constituted of two lines of overlapping combs, one fixed and the other mobile. The application of an electrostatic force causes the lateral displacement of the mobile comb, a movement that has the effect of varying the opposing surfaces, and thereby the capacitance.

This type of structure has different problems, and particularly high actuation voltages, a considerable size and a not very stable capacitance value.

Finally, it is possible to vary the permittivity of the medium present between the electrodes. For these "variable capacitances with dielectric variation", it becomes necessary to modify the composition of the air gap, normally composed of air or a vacuum, of constant permittivity. Thus, certain authors have used a mobile dielectric membrane in series with the air (Yoon J-B and Nguyen C T: "A high-Q tunable micromechanical capacitor with movable dielectric for RF application", *IEDM* 2000: 489-492). This geometry is technologically very complex to achieve, and requires a perfectly plane dielectric membrane with a controlled movement.

DESCRIPTION OF THE INVENTION

The present invention proposes mitigating the problems inherent in existing systems, and concerns a variable capacitance using another operating principle.

Moreover, the invention proposes recommending proven solutions in the prior art with regard to the actuation. The invention thus concerns a variable capacitance capacitor type device in which the actuation zone is dissociated from the capacitance variation zone; the actuation of the device according to the invention is preferably electrostatic.

According to the invention, a dielectric fluid placed in a cavity of the device is arranged between two capacitor electrodes; the quantity of dielectric fluid between the capacitor electrodes, and more specifically in the cavity, may be modulated by means capable of displacing the fluid, so as to vary the capacitance between the two electrodes.

In an advantageous manner, the variation in the quantity of dielectric fluid is achieved by the principle of communicating vessels, thanks to the presence of a second cavity communicating with the first through the intermediary of a fluidic passage. According to one embodiment, the two cavities are level with the fluidic passage, and of same height. Depending on the desired capacitance variation, the actuating cavity may be of volume greater than the cavity corresponding to the capacitor electrodes; it may also be possible to take advantage of a difference in level between the two cavities.

The displacement of the fluid is achieved through the intermediary of a membrane present in the second cavity, the deflection of which pushes the dielectric fluid towards the first cavity, and thereby increases the capacitance defined by the two capacitor electrodes.

According to a preferred embodiment, the variation in the quantity of fluid is carried out in an electrostatic manner thanks to actuation electrodes in the second cavity. The electrodes used to actuate the fluid are then independent of the capacitor electrodes. According to the embodiments and the range of variation, the actuation electrodes comprise the bottom and the top of the cavity or the top and wall in the form of a pan.

The invention further concerns a method for manufacturing such a variable capacitance capacitor. In particular, the method uses microelectronic techniques, with the formation of cavities and the fluidic passage on a substrate, for example in silicon, and the partial filling of the space thereby created by a dielectric fluid.

The method according to the invention provides for the formation of electrodes by deposition and etching, through the intermediary of the deposition of sacrificial layers.

BRIEF DESCRIPTION OF DRAWINGS

The appended figures will enable the invention to be better understood, but are only given by way of illustration and are in nowise limitative.

DETAILED DESCRIPTION OF SPECIFIC EMBODIMENTS

Figure 1:
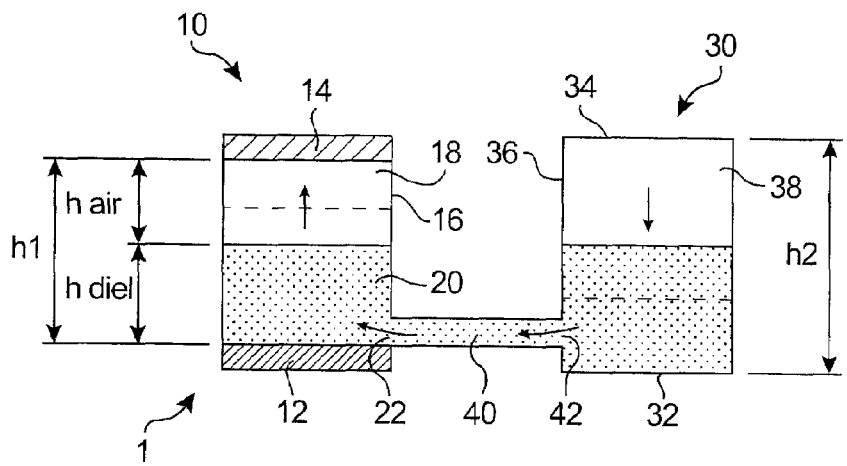
FIG. 1 schematically represents an embodiment of a capacitor according to the invention.

In a capacitor 1 according to the invention, schematised in FIG. 1, a first cavity 10 concerns the actual function of capacitor of the device, with two capacitor electrodes 12, 14. The first cavity 10 has a bottom wall, a top wall, and lateral walls 16. According to the preferred embodiment represented, the two capacitor electrodes 12, 14 form the bottom and top walls respectively; however, they can also not delimit the cavity 10, for example be separated by the space of the cavity 10 by interposition of a layer of solid dielectric (not represented), or be smaller than the actual bottom and top walls.

The two capacitor electrodes 12, 14 are separated by a first height, or air gap, h1. The medium of the air gap is mixed: it comprises a layer of air, or neutral gas (argon, nitrogen, for example), 18 above a layer of a dielectric fluid 20. The capacitance $C_{eq}$ of the cavity 10 is equivalent to the two capacitances due to air 18 and the dielectric 20 in series, and is expressed in the form:

$$\frac{1}{C_{eq}} = \frac{1}{C_{air}} + \frac{1}{C_{diel}} \quad (1)$$

$$C_{eq} = \frac{\varepsilon_{air}\varepsilon_{diel}S}{h_{diel} + \varepsilon_{diel}h_{air}} \quad (2)$$

where $C_{eq}$, $C_{diel}$, $C_{air}$ are respectively the capacitances of the air gap layers, dielectric fluid 20 and air 18; $h_{diel}$ and $h_{air}$ respectively heights of the dielectric fluid 20 and the air 18 ($h_{diel}+h_{air}=h1$); S opposing surface area of the electrodes 12, 14.

One observes by this relation (2) that the presence of the "dielectric layer" (or a dielectric fluid) increases the value of the equivalent capacitance if the thickness of dielectric $h_{diel}$ is not negligible compared to the thickness of $h_{air}$.

Advantageously, the dielectric fluid 20 present in the device according to the invention has a permittivity much higher than that of air (or a neutral gas), for example from 100 to 500, so as to optimise the possible values of $C_{eq}$. The fluid used may be commercially available, for example DALIA AX™, NOVEC HFE 7500™ or instead the series of BP Dielectric™ fluids, or any other equivalent.

The equation (2) also shows that the position of the interface between the air 18 and dielectric fluid 20 makes it possible to modify the value of the resulting capacitance $C_{eq}$. The capacitor according to the invention is therefore equipped with means to vary the quantity of dielectric fluid 20 between the electrodes 12, 14, and consequently to obtain the desired capacitance variation.

In particular, an orifice 22 is present on one of the walls 16 of the cavity 10 so as to enable the volume of dielectric fluid 20 present within the cavity 10 to be modulated, in other words its thickness $h_{diel}$, and thereby the capacitance value $C_{eq}$. The orifice 22 is coupled to means enabling the dielectric fluid 20 to be displaced in a direction and outside of the cavity 10 in order to obtain a variable capacitance capacitor. Said means may be of any type, such as a pump.

According to a preferred embodiment, the principle of communicating vessels is used by the means to displace the dielectric fluid 20.

Thus, a second cavity 30, delimited by a bottom part 32, a top part 34 and lateral walls 36 contains dielectric fluid 20 and air or neutral gas 38. The second cavity 30 is placed in communication with the first cavity 10 through the intermediary of a fluidic passage 40 thanks to a second orifice 42 in a wall, lateral 36 in this embodiment.

The dielectric fluid 20, denser than air, is free to circulate through the fluidic passage 22, 40, 42. The volume of dielectric fluid 20 in the device 1 is lower than the volume of the two cavities 10, 30 in order to enable said circulation.

Initially, through the principle of communicating vessels, there is the same level of fluid in the two cavities 10, 30. Advantageously, the bottom part 32 of the second cavity 30 is located on a same plane as the bottom electrode 12 of the first cavity 10; in the same way, the two orifices 22, 42 are opposite and adjacent to the bottom plane in order to facilitate the modelling of quantities of fluid 20 in each cavity 10, 30. The second height h2 of the second cavity 30 is preferably identical to the height h1 separating the two capacitor electrodes 12, 14.

If an excess pressure (arrow in the figure) is applied to the dielectric fluid 20 in the second cavity 30, the fluid 20 is forced towards the first cavity 10 through the passage 40, in order to attain the same air pressure on the dielectric fluid 20 in the two cavities 10, 30: the volume of dielectric fluid 20 increases in the first cavity 10, in other words the quantity of dielectric fluid 20, separating the two electrodes 12, 14 increases, in other words the height $h_{diel}$, and the resulting capacitance $C_{eq}$ increases. Inversely, if the excess pressure decreases, the capacitance $C_{eq}$ of the first cavity 10 decreases.

Figure 2:
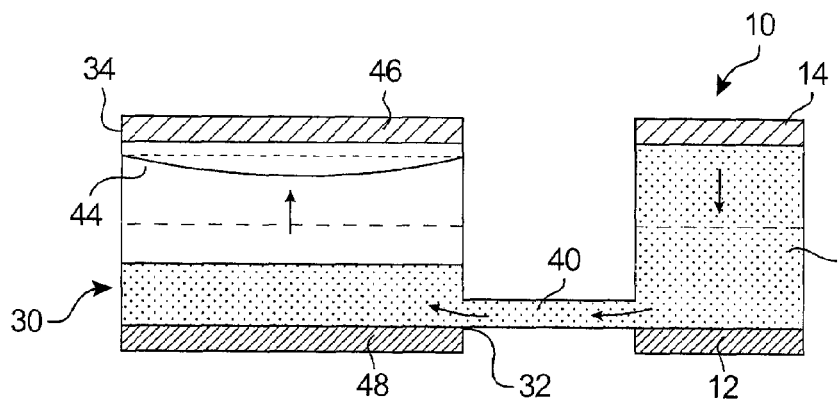
FIG. 2 shows a preferred embodiment of a capacitor according to the invention.

Advantageously, the excess pressure in the second cavity 30 is achieved by compression of the volume of air 38 by deflection of a membrane 44, as schematised in FIG. 2. Advantageously, at rest, the membrane 44 is adjacent to the top part 34 of the second cavity 30; in this respect, it should be noted that the space between the two elements shown in FIG. 2 is only illustrative in order to better display the operation of the device.

In a preferred manner, the membrane 44 is activated in an electrostatic manner, in other words deformable under the action of a control voltage between two electrodes 46, 48; this type of membrane normally comprises an electrode bonded to a structural layer, or a series of structural layers. The flexible and leak tight membrane 44 may thus compose the top part 34, which thereby comprises a metallic electrode layer 46 and a layer having good mechanical properties 50 (see FIG. 3b), advantageously also metallic. Certainly, a monolayer of Au, Cr or Ni could accomplish the two functions (of electrode and membrane), but it is advantageous to have two separate layers. In this case, preferably, an intermediate tie layer, for example in Ti or Cr, is located between the two separate layers. Moreover, additional layers may be added to modify the compressive stresses in order to obtain a more flexible device (for example tri-layer for the electrode: Ni in voltage-Au-oxide in compression). Advantageously, the membrane 44 is protected from the environment, for example by encapsulation of the device according to known microelectronic "packaging" techniques.

The actuation is achieved in the cavity 30 by the creation of a difference in potential between two actuation electrodes 46, 48 located on either side of the membrane 44, leading to the creation of an electrostatic force between the two electrodes, which brings about a deflection of the membrane 44. In the example of FIG. 2, the two actuation electrodes 46, 48 are localised in the bottom 32 and top 34 parts of the second cavity 30, one of the electrodes 46 forms part of the membrane 44. Advantageously, a structural layer 50, for example in nitride, coats the electrode 46. The difference in potential between the two electrodes 46, 48 causes the membrane 44, or the electrode 46—structural layer 50 assembly, to deflect from the top part 34.

The deflection of the membrane 44 pushes the dielectric fluid from the cavity 30 towards the cavity 10, which varies the capacitance $C_{eq}$ of said cavity. However the position of the membrane 44 as a function of the actuating voltage applied between the electrodes 46, 48 is reproducible and follows a determinable law. In particular, since there does not exist, in the preferred case, any electrode-dielectric-electrode contact, the charges migrating through the layer of dielectric material that separates the two electrodes 46, 48 do not interfere with the operation of the component 30: there are no problems of charges. There thus exists a relation giving the variation in the capacitance $C_{eq}$ as a function of the voltage applied to the actuation electrodes 46, 48.

Advantageously, for a maximum voltage leading to a certain deflection of the membrane 44 represented by a solid line in FIG. 2, the first cavity 10 is entirely filled with dielectric fluid 20; the capacitance value $C_{eq}$ is then maximum. On return to a zero voltage (membrane at rest, dashed line in FIG. 2), the capacitance value $C_{eq}$ returns to its minimum value at rest, given by the value determined by the position of the interface of the dielectric liquid with the "levelling" air between the two cavities 10, 30 (dotted line in FIG. 2, and represented in FIG. 1).

The cavities 10, 30 may be of identical or different size, as identical or different shapes (cubic, cylindrical, etc.). In particular, their surface area can differ depending on the capacitance values and the desired capacitance variation. To have a high capacitance value $C_{eq}$ with a high variation, it is preferable that the second cavity 30 has a surface area greater than the cavity 10. Thus, there is more fluid 20 available for a greater variation in level of the fluid in the cavity 10.

According to one embodiment, the second cavity 30 has a surface area of 600 µm×600 µm for a height h2 of 5 µm to 20 µm. The cavity 10 then has the same height h1 of 5 µm to 20 µm, for a surface area S of 400 µm×400 µm to 600 µm×600 µm.

Figure 3A:
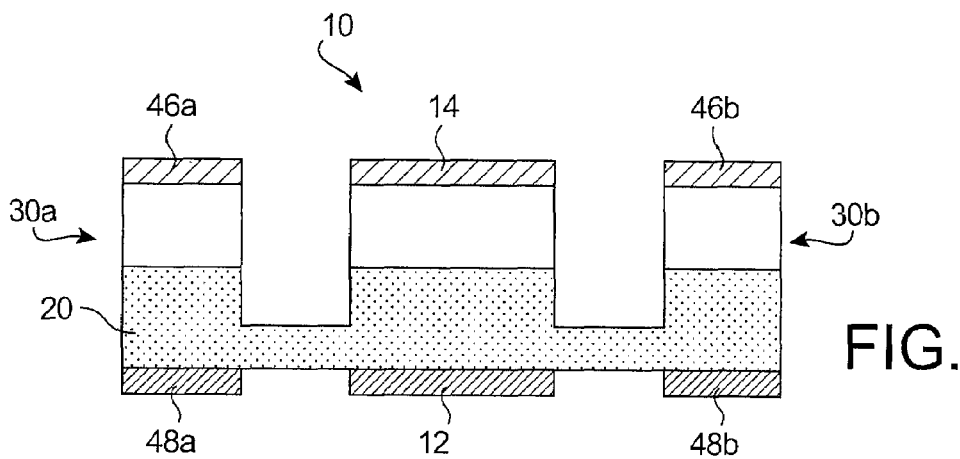
FIGS. 3a-3c represent alternative embodiments of a capacitor according to the invention.

It may be interesting to have moreover several actuation cavities 30a, 30b for a first cavity 10 in order to have available a greater volume of fluid 20, and thereby obtain a higher capacitance variation: see FIG. 3a. In this embodiment, it is possible to actuate for example only one of the two pairs of electrodes 46a, 48a and to displace the fluid 20 towards the two cavities 20, 30b. It may however be advantageous to conduct a simultaneous application of voltage to the two pairs 46a, 48a, 46b, 48b in order to obtain the filling uniquely of the cavity 10 relative to the capacitance variation: the actuation voltage necessary for the volume variation is then less, which facilitates the formation for example of on-board type components.

In order to obtain low actuating voltages, a locally smaller actuation air gap may also be used: the higher electrostatic forces make it possible to obtain an initiation of the deflection of the membrane 44 for low voltages. An alternative embodiment of the invention schematised in FIG. 3b thus has an actuation cavity 52 in which the profile of the walls 54 is a pan. The second actuation electrode 56 is here localised on the walls 54.

Thanks to the invention, the actuation is dissociated from the capacitance variation; in particular in the case of a radiofrequency application, the RF power associated with the capacitor electrodes 12, 14 of capacitance $C_{eq}$ does not perturb the variation in said capacitance, which is assured by independent electrodes 46, 48, 56. Moreover, the use of a dielectric fluid 20 of high permittivity $\epsilon_{diel}$ enables high capacitance values $C_{eq}$ to be attained, while at the same time maintaining a wide range of capacitance variation. Finally, unlike air gap variation capacitances, there are no problems of charges, and unlike surface area variation capacitances, the actuating voltage remains low.

Figure 3B:
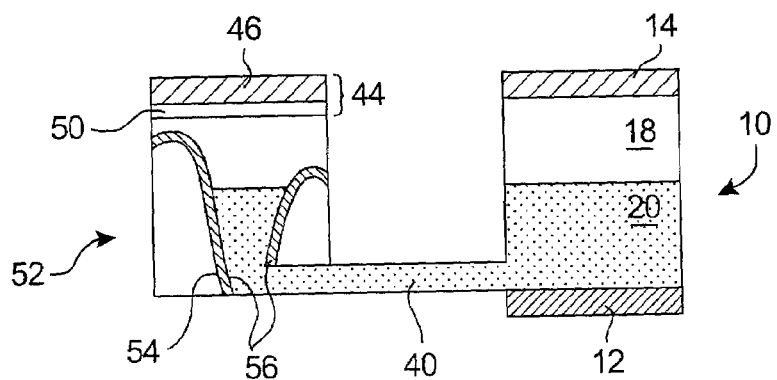
Figure 3C:
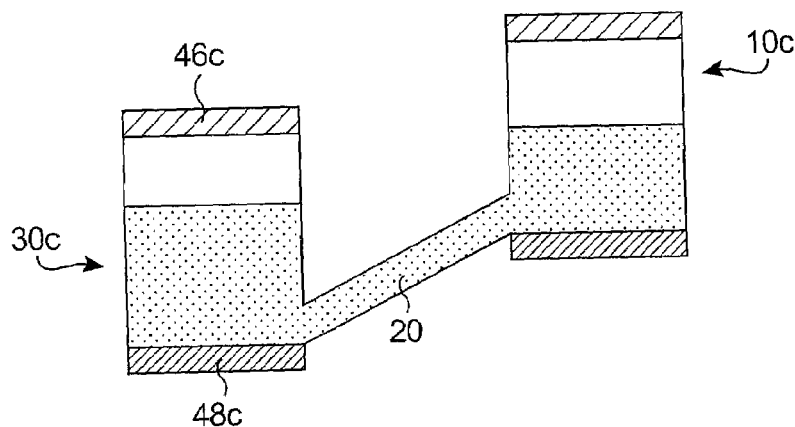

It is also possible to take advantage of the difference in height in the principle of communicating vessels in order to increase the range of capacitance variation: as schematised in FIG. 3c, if the actuation part 30c is on a plane lower than the first cavity 10c, the dielectric fluid is initially principally localised in the second cavity 30c and the initial capacitance $C_{eq}$ of the first cavity is low. An actuation of the electrodes 46c, 48c of the second cavity 30c enables the first cavity 10c to be filled; the difference between the two minimum and maximum capacitances of the device is increased.

According to a preferred embodiment, the capacitor according to the invention may be manufactured by conventional microelectronic technologies. In particular, techniques on silicon may be employed.

Figure 4A:
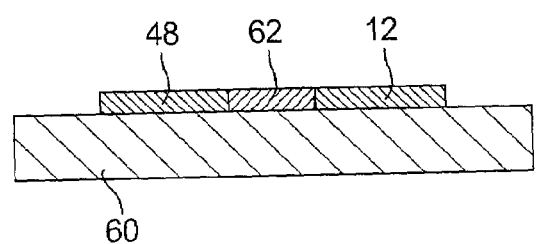
FIG. 4 show a diagram for producing a capacitor according to the invention.

For example and as schematised in FIG. 4, one positions on a substrate in silicon 60 the bottom, capacitor (or RF) 12 and actuation 48 electrodes, for example by deposition and etching of 300 nm Ti and 1 µm of gold; then one levels the fluidic passage by deposition and etching in the space between the electrodes of a layer 62, for example 1.3 µm of $Si_3N_4$ (FIG. 4a).

Figure 4B:
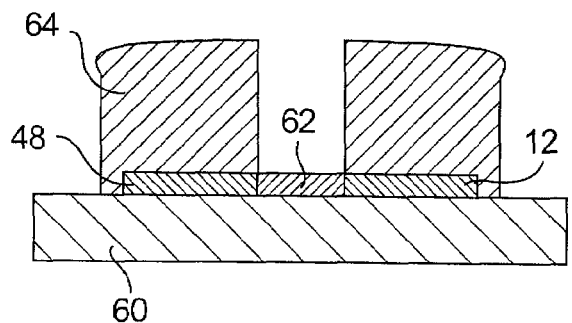
Figure 4C:
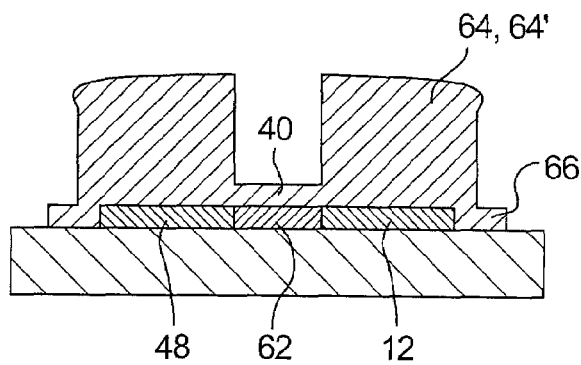

One then deposits the sacrificial resin, for example a polyimide or an oxide, which delimits the spaces of the cavities 10, 30, 40. Preferably, this positioning is carried out in two steps: the assembly 60, 12, 48, 62 is covered with a layer of resin 64, which is then etched so as to define the two cavities 10, 30 (FIG. 4b). Then, a second layer of sacrificial resin, identical or different, 64' is deposited and etched, so as to define the fluidic passage 40 and the lateral tunnels 66 making it possible to eliminate at a later stage the sacrificial resin and to fill the cavities 10, 30, 40 (FIG. 4c).

Figure 4D:
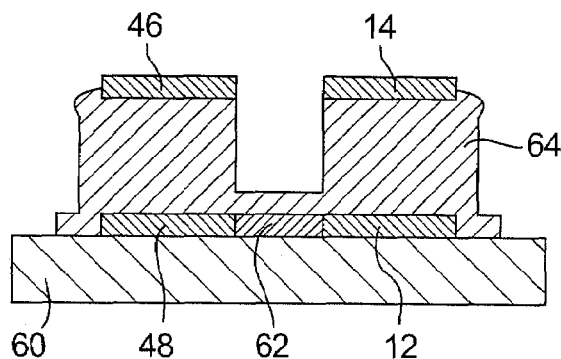
Figure 4E:
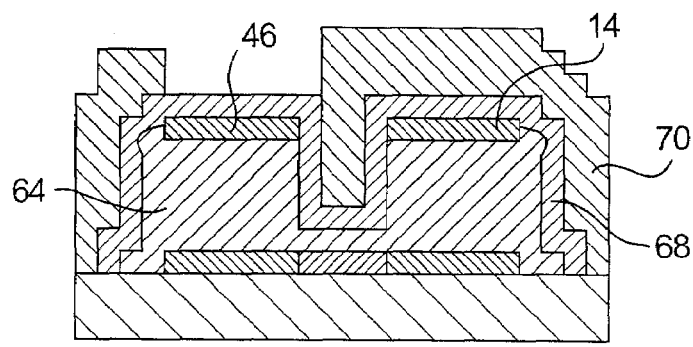
Figure 4E:
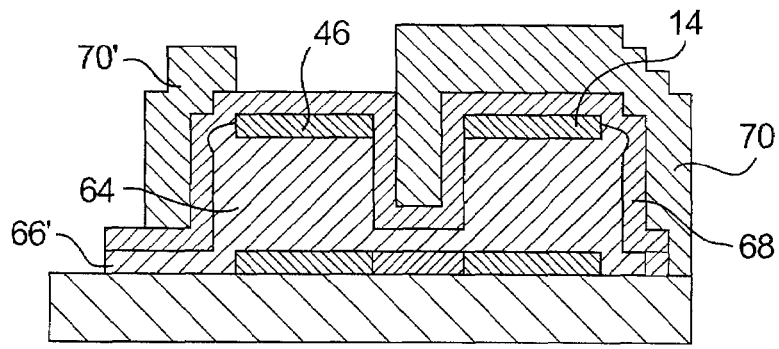

The upper actuation 46 and RF 14 electrodes are then put in place, for example by deposition and etching of 300 nm of Ti and 1 µm of gold (FIG. 4d).

The structural layer 68 delimiting the walls and the top part may then be deposited and etched, for example by leaving 1 µm of $Si_3N_4$. Advantageously, a reinforcement layer 70, for example in $Si_3N_4$ or in oxide, of thickness 5 µm is then put in place (FIG. 4e) to strengthen in particular the sides of the cavities.

Figure 4F:
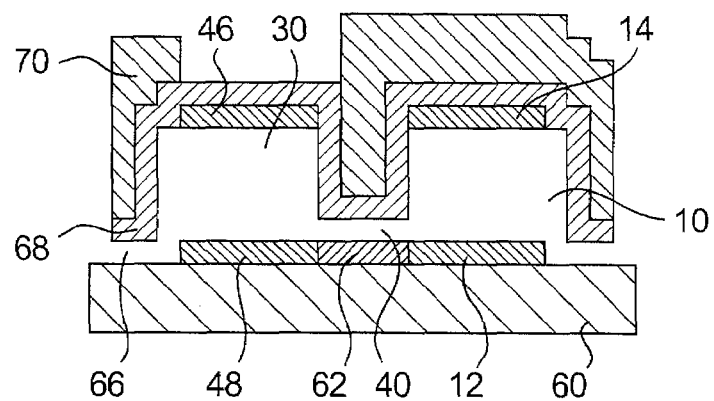

The assembly from the previous step is etched, in particular laterally, in order to be able to open the tunnels 66 and attain an overall final external shape. To achieve an easier chemical etching, it is possible to form for example a long tunnel 66' (see FIG. 4e'), and not to touch the reinforcement layer 70'. The interior sacrificial layer 64 is then eliminated by any known means (FIG. 4f).

Figure 4G:
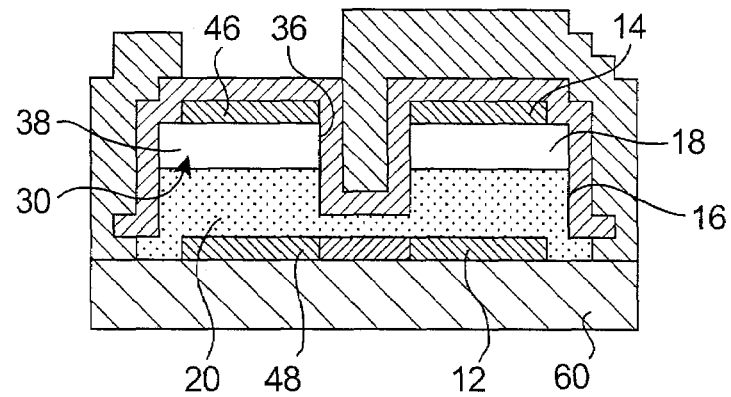

The dielectric fluid 20 is then introduced, and the lateral tunnels 66 are sealed, for example by a deposition/etching of oxide, with a hard mask on the membrane 46 to avoid altering its rigidity (FIG. 4g).

As regards the filling of the cavities by the dielectric fluid 20, one may for example deposit a "drop" of fluid 20 in front of the tunnel 66, the fluid migrating in the cavity 10, 30, 40 through capillarity. Another possibility is to dip the device of FIG. 4f entirely in the solution of dielectric fluid 20 after having vacuumized the cavities: said cavities are filled, then are sealed. A device using a syringe to inject the liquid may also be used.

To form the structure with pan of FIG. 3b, it is possible to repeat the method described previously in FIG. 4 by adding a step of deposition of a "sacrificial" material and a step of chemical mechanical polishing (CMP). Reference is made to patent application FR 03/50911. In particular, the pan shaped cavity is formed in several steps, with deposition of a "hard" material intended for the edges, filling by a less hard insulator material, and CMP of the assembly: due to the difference in hardness, a groove or pan shaped cavity is formed. Then, it is possible to conduct the deposition of the electrode 56 on the walls as described previously.

Obviously, these embodiments are only given by way of illustration and alternatives are possible. In particular, the chemical etchings may be replaced by plasma etchings or by a high frequency vapour method; the $Si_3N_4$ may be replaced, totally or in combination, by SiN and/or Si and/or $SiO_2$, just as Cr/Au or Al/Si may be understood as alternatives to Ti/Au.

The invention claimed is:

1. Variable capacitance ($C_{eq}$) capacitor comprising:
   a first and a second capacitor electrode,
   a first cavity having a first volume and containing a dielectric fluid such that a quantity of the dielectric fluid is arranged between the capacitor electrodes, and
   means of varying the quantity of dielectric fluid between the capacitor electrodes comprising at least a second cavity having a second volume and delimited at least by a bottom part and a top part, the second cavity being connected to the first cavity by a fluidic passage, a flexible leak tight membrane capable of being deformed under the action of a control voltage, and a first and a second actuation electrode capable of modifying the volume of the second cavity.

2. Capacitor according to claim 1 in which the dielectric fluid has a dielectric constant greater than that of air.

3. Capacitor according to claim 2 in which the dielectric fluid is an oil.

4. Capacitor according to claim 1 in which the volume of dielectric fluid in the capacitor is less than the sum of the first and second volumes.

5. Capacitor according to claim 1 in which the first cavity has a bottom part and a top part, and in which the heights separating the bottom parts and the top parts of each cavity are equal.

6. Capacitor according to claim 1 in which the first cavity has a bottom part and the bottom parts of each cavity are located on a same bottom plane, the first capacitor electrode being parallel to the bottom plane.

7. Capacitor according to claim 1 in which the fluidic passage is in communication with the first and second cavities by, respectively, a first and a second orifice that are adjacent to the bottom plane.

8. Capacitor according to claim 1 in which the first cavity has a bottom part and the bottom parts of each cavity are not located on a same plane.

9. Capacitor according to claim 1 in which the first actuation electrode is comprised in the top part and the second actuation electrode is comprised in the bottom part of the second cavity.

10. Capacitor according to claim 1 in which the second cavity comprises walls in the form of a pan between the bottom part and the top part, the first actuation electrode is comprised in the top part and the second actuation electrode is comprised in the walls of the second cavity.

11. Capacitor according to claim 1 in which the second volume is greater than the first volume.

12. Method for manufacturing a variable capacitance capacitor comprising:
   the manufacture of at least two cavities interconnected by a fluidic passage on a support, comprising the putting in place of two first electrodes each assigned to one of the two cavities, and the putting in place of a sacrificial resin to form the cavities and the fluidic passage,
   the putting in place of a membrane on the sacrificial resin forming a second cavity,
   the putting in place of a capacitor electrode on the sacrificial resin of the first cavity and an actuation electrode on the membrane of the second cavity,
   the putting in place in the cavities of a volume of dielectric fluid less than the volume of the two cavities.

13. Method according to claim 12 in which a wall of each cavity and of the fluidic channel is parallel to the support.

14. Method according to claim 13 comprising the deposition of a layer of electrode on the support, the etching of the layer of electrode to form the wall of each cavity parallel to the support.

15. Method according to claim 14 comprising the putting in place of a leveling layer between the two first electrodes.

* * * * *